United States Patent [19]

DeVolpi

[11] Patent Number: 4,649,015

[45] Date of Patent: Mar. 10, 1987

[54] MONITORING SYSTEM FOR A LIQUID-COOLED NUCLEAR FISSION REACTOR

[75] Inventor: Alexander DeVolpi, Bolingbrook, Ill.

[73] Assignee: The United States of America as represented by the United States Department of Energy, Washington, D.C.

[21] Appl. No.: 632,743

[22] Filed: Jul. 20, 1984

[51] Int. Cl.⁴ .............................................. G21C 17/00
[52] U.S. Cl. ..................................... 376/258; 376/245
[58] Field of Search ............. 376/258, 245; 73/290 R, 73/291; 250/270, 357.1

[56] References Cited

U.S. PATENT DOCUMENTS

| | | | |
|---|---|---|---|
| 3,501,632 | 2/1970 | Kaminskas et al. | 250/357.1 |
| 4,092,542 | 5/1978 | DeVolpi | 250/358 R |
| 4,268,753 | 5/1981 | Murakami et al. | 250/357.1 |
| 4,302,288 | 11/1981 | Youngborg | 376/258 |
| 4,322,267 | 3/1982 | Kinoshita et al. | 376/258 |
| 4,394,346 | 7/1983 | Morooka | 376/258 |
| 4,418,035 | 11/1983 | Smith | 376/258 |
| 4,440,717 | 4/1984 | Bevilacqua et al. | 376/258 |
| 4,449,403 | 3/1984 | McQueen | 376/258 |
| 4,521,373 | 6/1985 | Terhune et al | 376/258 |

OTHER PUBLICATIONS

Nuclear Technology, vol. 27 (11/75) pp. 449–487, DeVolpe et al.

Primary Examiner—Salvatore Cangialosi

Attorney, Agent, or Firm—Charles F. Lind; Gustavc Siller, Jr.; Judson R. Hightower

[57] ABSTRACT

A monitoring system for detecting changes in the liquid levels in various regions of a water-cooled nuclear power reactor, viz., in the downcomer, in the core, in the inlet and outlet plenums, at the head, and elsewhere; and also for detecting changes in the density of the liquid in these regions. A plurality of gamma radiation detectors are used, arranged vertically along the outside of the reactor vessel, and collimator means for each detector limits the gamma-radiation it receives as emitting from only isolated regions of the vessel. Excess neutrons produced by the fission reaction will be captured by the water coolant, by the steel reactor walls, or by the fuel or control structures in the vessel. Neutron capture by steel generates gamma radiation having an energy level of the order of 5–12 MeV, whereas neutron capture by water provides an energy level of approximately 2.2 MeV, and neutron capture by the fission fuel or its cladding provides an energy level of 1 MeV or less. The intensity of neutron capture thus changes significantly at any water-metal interface. Comparative analysis of adjacent gamma detectors senses changes from the normal condition with liquid coolant present to advise of changes in the presence and/or density of the coolant at these specific regions. The gamma detectors can also sense fission-product gas accumulation at the reactor head to advise of a failure of fuel-pin cladding.

16 Claims, 19 Drawing Figures

(a) COOLANT FLOW
(b) FILLED COLD
(c) HOMOGENEOUS VOIDING
(d) PHASE SEPARATION HEAD VOIDING
(e) DOWNCOMER VOIDING
(f) CORE UNCOVERED
(g) DOWNCOMER REFILLED, CORE RECOVERED

MONITORING SYSTEM FOR A LIQUID-COOLED NUCLEAR FISSION REACTOR

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

Safety of operation of nuclear fission power reactors is one of the utmost concerns for the Nuclear Regulatory Commission, the operating utility, and the public. This includes the reliability of the reactor containment should some malfunction occur. This also includes the reliability and accuracy of the reactor controls relating to the actual operating conditions in the reactor. This is needed in order to provide prompt and appropriate corrective measures should some malfunction occur in order to minimize reactor damage and to maximize public safety.

The conventional water-cooled nuclear fission reactor has a reactor core and fuel and control elements are arranged in a matrix fashion in the core. By moving the control elements axially within the core the fission reaction of the fuel elements is regulated, as is the generation of heat. Two common water-cooled reactors are the pressurized-water and the boiling-water types. This invention illustrates application to the pressurized-type.

The core of the pressurized-water reactor is held in a liquid tight vessel, and cooling water is initially directed via a "downcomer" region adjacent the vessel wall to a lower plenum underlying the reactor core, is directed then upwardly through the core and over the fuel elements to an upper plenum overlying the core, and is then directed to exterior heat exchanger means for generating steam.

Different off-normal conditions could exist where: (1) water could be in the downcomer region but not within the core; or (2) vice versa; or (3) where the water could be at some intermediate level in the vessel, such as in the lower plenum, in the core, in the upper plenum, or in the head. In addition, the density of the water within the vessel can possibly vary if steam mixes with the water, which can be of great significance depending on the type, design, and normality of these cooling conditions. Thus, not only must the presence and/or lack of water in the reactor vessel broadly be confirmed, but such information for all or any of these specific regions would be useful to minimize uncertainties and provide signal correlation as to the operation of the reactor cooling system. Expanded efforts have thus since been directed to provide better and redundant detection of the reactor cooling system including specifically the level of the coolant water therein.

Several different types of internal or intrusive monitors have been proposed, using detectors for measuring such properties as (1) water pressure or (2) the presence of neutrons emitting from nuclear reactions. With the internal monitors, the detectors are within the reactor vessel while the readout devices are located outside of the reactor vessel. Conduits must therefore be used between the detectors and readout devices, and these conduits must pass through the reactor vessel itself and possibly other pressure boundary structures; this forms one major drawback to internal monitors. Another major drawback to internal monitors is the survival of the detector itself, located within the confines of the reactor vessel, through the cause or effect of the accident that might be responsible for the change of water level in the first place. Furthermore, pressure monitors prove insensitive in distinguishing between water and water-steam mixtures; and neutron detection has heretofore been of limited precision in detecting the water level inside the vessel.

External or nonintrusive monitors are also available, where the detector and readout device are located outside of the reactor vessel, so that the drawbacks of internally located detectors are eliminated. One such external control is known as a source range or low intensity neutron detector. The detector is designed to respond to low start-up power levels, perhaps 1-10% of full output power. Although the output signals change with changing water levels in the reactor vessel, the resolution is too poor to advise with sufficient reliability and accuracy of the water level in the reactor.

Intrusive and nonintrusive instrumentation each has generic virtues and each must cope with problems arising from differences in flow, turbulence, phase changes, hydraulic constraints, local heat or neutronic conditions, and effects due to fuel management. Each must address the need for data in the reactor head and downcomer regions, and elsewhere in the core. The main generic advantages of nonintrusive monitoring systems are lack of penetration into the pressure boundary and inherent nondestructibility.

My Pat. No. 4,092,542 issued May 30, 1978 and titled "High-Resolution Radiography by Means of a Hodoscope" illustrates a nonintrusive scanning system that is related to the invention to be disclosed herein.

SUMMARY OF THE INVENTION

The invention provides improved means for detecting the water levels in various regions of a water-cooled nuclear power reactor, viz., in the downcomer, in the core, in the inlet and outlet plenums, at the head, and elsewhere: and also for detecting the density of the water in these regions.

The invention utilizes a plurality of exterior gamma radiation detectors and a collimator technique operable to sense separate regions of the reactor vessel to give respectively, unique signals for these regions, whereby comparative analysis of these signals can be used to advise of the presence and density of cooling water in the vessel.

A basic object of this invention is to provide an improved monitoring system of the exterior type that can be built into new or can be retrofitted into existing water-cooled nuclear fission reactors and used to generate reliable signals for determining with exactness the level and density of the cooling water at varying locations within the reactor.

A more specific object of this invention is to provide a monitoring system having gamma radiation detectors located proximate to the exterior of the reactor vessel, the detectors being arranged to sense the gamma radiation at specific locations or regions within the vessel, so that comparative signals can be obtained from the detectors and utilized to infer the presence and level or density of water in the vessel.

The invention provides a plurality of gamma radiation detectors arranged vertically along the reactor vessel itself, and collimator means for each detector to limit the detection of gamma radiation from only isolated regions of the vessel, where the detectors cumulatively provide sufficient readout signals from the entire reactor vessel vertically and radially at specific regions in the reactor vessel, (viz., in the core, the downcomer, and the head) that comparative analysis of these readouts yields precise indications of the water level and water density therein, all independently of the power level of the reactor.

The concept provides that capture by steel of neutrons emanating from the core generates gamma radiation having a high energy level of the order of 5-12 MeV, well above the gamma radiation energy level of fission of the fuel or of the capture of neutrons in the water coolant. The capture of gamma radiation in water provides an energy level of approximately 2.2 MeV. The detection of gamma rays can be accomplished in a thallium-activated sodium-iodide scintillation detector for example simply by reducing or increasing the bias of the detector and adjusting its sensitivity. In the water reactor essentially all excess neutrons produced by the fission reaction that do not leak out of the pressure vessel will be thermalized and captured in the water or the steel within the vessel. The intensity of neutron capture changes significantly at any water interface. Even though the steel walls of the pressure vessel are of considerable thickness (15-20 centimeters), the energetic capture-gamma radiation has a relatively high probability of the order of 1% or higher of penetrating the steel walls and escaping from the reactor vessel.

The apparatus described by this invention will also serve to detect by means of fission-product gas accumulation at the reactor head the failure of fuel-pin cladding.

Application of the invention to reactors cooled by heavy water or organic solutions, as well as other liquids such as sodium in fast reactors, is also intended, with some appropriate modifications although the most imminent application is for the retrofit or new construction of light-water reactors.

BRIEF DESCRIPTION OF THE DRAWINGS

FIGS. 8a, b, c, d, e, f, and g are graphical and diagrammatical illustrations of various water level and density conditions that might occur in the reactor, and which would be interpreted by an analysis of the signals obtained with the disclosed instrumentation:

FIG. 10 is a graphic illustration of the relative intensity of gamma radiation at representative energy levels of interest that each of the detectors will be adjusted to respond to and provide threshold signals for.

DETAILED DESCRIPTION OF THE INVENTION

Figure 1:
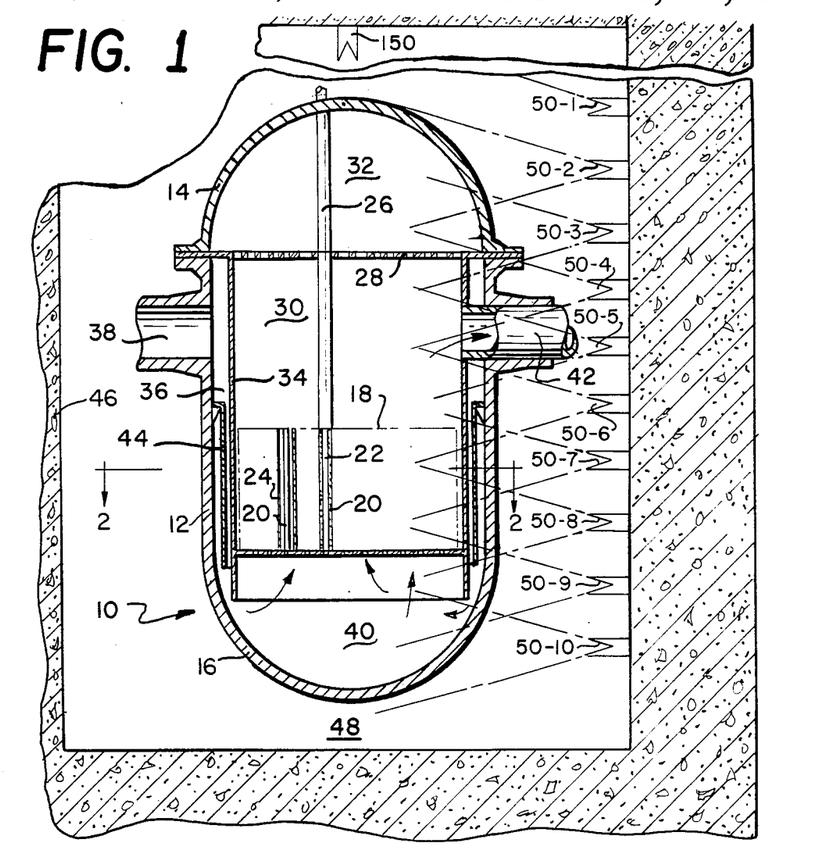
FIG. 1 is an elevational sectional view of a typical nuclear fission reactor of the pressurized water type, showing a preferred embodiment of the subject invention incorporated therein.

FIG. 1 illustrates in a simplified elevational sectional view a nuclear fission reactor of the pressurized-water type. The reactor includes a water-tight pressure vessel 10 formed with a generally cylindrical intermediate wall 12 and domed opposing top and bottom cross walls 14 and 16, respectively. A core 18 having a honeycomb arrangement of vertical passages 20 (FIG. 2) is disposed within the vessel generally proximate the lower end thereof, and a plurality of control elements 22 and fuel elements 24 are positioned within the core passages. Extender rods 26 project upwardly above the core from the control element 22 and through the upper cross wall 14 to control mechanism (not shown) located outside of the vessel.

An upper support plate 28 extended crosswise of the reactor vessel is apertured near its central portion to establish and provide fluid interconnection between an upper plenum region 30 immediately above the reactor core 18 and a head region 32 immediately below the cross wall 14. A downcomer or core barrel wall or skirt 34 is supported inwardly and concentrically of the cylindrical vessel wall 12 around the core and vertically between the core and the support plate 28 and defines a downcomer plenum region 36 surrounding the core 18 but isolated from the core except via lower plenum 40. A coolant inlet connection is made via line 38 to this downcomer region 36, which communicates then via lower plenum region 40 underlying the core 18, and via the core passages 20 with the upper plenum region 30. A coolant outlet connection is provided via line 42 from the reactor vessel 10, communicating with an appropriate heat exchanger (not shown) for generating steam which in turn can be expanded through power turbines (not shown) or the like.

A thermal shield 44 surrounds the core 18 spaced between the vessel wall 12 and downcomer wall 34. Webbing supports of the shield (not shown) allow for coolant flow on both sides of shield in the annular regions between the core barrel and the vessel wall.

The entire reactor vessel 10 is confined within a biological shield 46, typically in the form of reinforced concrete walls, which surrounds the sides, and top and bottom of the vessel. Typically, some radial clearance space 48 (the dry well) exists between the vessel 10 and the biological shield 46.

To provide reactor operation, the control mechanism (not shown) raises and lowers the extender rods 26 and connected control elements 22 selectively relative to the stationary fuel elements 24 in the reactor core 18, which thereby respectively increases or decreases the reactor fission output. The fission output generates heat, and coolant water under pressure is directed from the inlet line 38 (see FIG. 8a) down the circumferentially defined downcomer region 36 to the lower plenum 40 and upwardly then through the core passages 20 and over the fuel elements 24 and control elements 22 therein to the upper plenum 30 and then via outlet line 42 from the reactor vessel 10 for utilizing this heat energy in the exterior conversion means (not shown).

When starting cold, the coolant water completely fills the reactor vessel (see FIG. 8b), being present in the downcomer 36, in the lower plenum 40, in the core passages 20, in the upper plenum 30 and in the head 32. During operation and heat buildup (or should some malfunction occur such as loss of coolant pressure or the like) there is the possibility (or even the likelihood) that this water level and density will change in certain of these regions (see FIGS. 8c, 8d, 8e, 8f and 8g, for example) to form water-steam mixtures, and/or voids. The cooling capacity would, of course, then be reduced.

Figure 8:
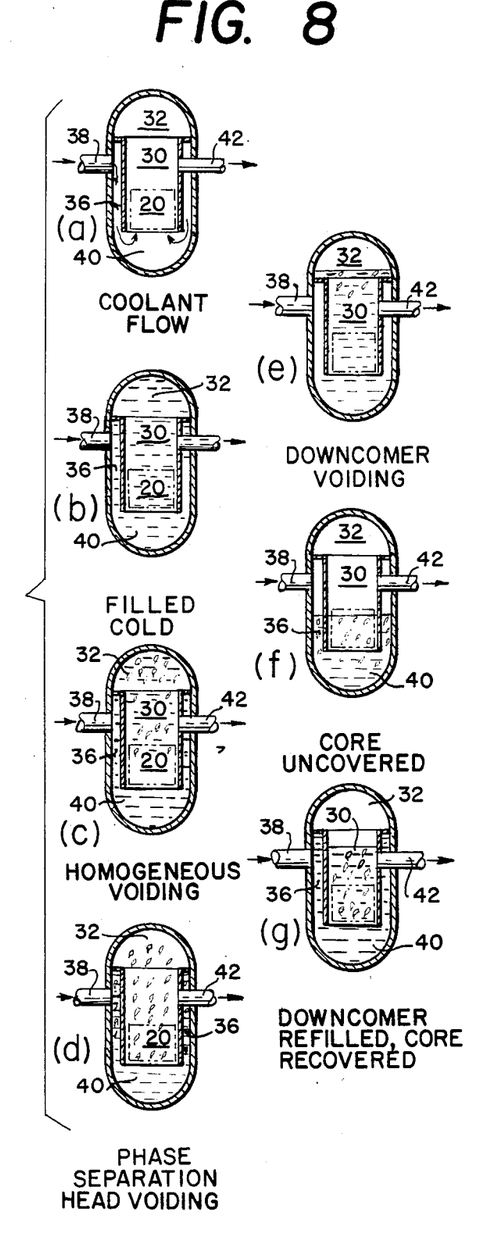

For example, the transition between pure water (see FIG. 8b) and a homogeneous flashing or voiding condition can occur, resulting in a liquid-steam mixture uniformly present substantially throughout the core 20 and upper-plenum and head regions 30 and 32, where liquid would continue to exist in the downcomer 36 and lower plenum 40 (FIG. 8c). Subsequent phase separation could cause head voiding (see FIG. 8d) and the water level to fall within the vessel but yet being of a liquid-steam mixture and with the downcomer 36 and lower plenum 40 yet being filled with liquid water. Subsequently, the downcomer 36 can be voided (see FIG. 8e) leading to head voiding also where the core might yet be covered with at least a liquid-steam mixture. Lastly, of course, voiding can occur in the downcomer, head and upper plenum regions even to where the core also becomes uncovered (see FIG. 8f), and liquid coolant may only exist in the lower plenum 40. Without continuing coolant flow, the liquid in the core would quickly vaporize because of the heat of continuing fission and/or of even the radiation decay heat. When the fuel elements are no longer covered by the liquid water, the likelihood of overheating and damage to the fuel elements and/or to the core itself would rise appreciably.

This invention provides for the use of gamma detectors 50 laterally spaced from the exterior of the reactor vessel 10 and each collimated to sense the radiation emitted from only a selected component part or region of the reactor. This is possible and of value to this invention since the source and intensity of the gamma radiation can be inferred as follows:

The general fission reaction results in the generation of neutrons, both slow and fast, as well as gamma radiation. The slow neutrons generally are of energy levels less than one electron volt (1 eV) and have little memory as to their origins, and are of little direct value in this invention. The fast neutrons are at energies between one and possibly ten mega-electron volts (MeV), and have any of three destinies: (1) to penetrate through the walls and escape from the reactor vessel; (2) to strike the fuel, water or steel components in the core itself and be scattered as slow neutrons, or (3) to strike the fuel, water or steel components and be absorbed or captured by the particular component.

The average energy of gamma radiation caused when neutrons are absorbed or captured in fuel is less than 1 MeV. When neutrons are captured by water (hydrogen) a gamma radiation is generated having an approximate value of 2.2 MeV; whereas when neutrons are captured in steel the gamma radiation is higher, generally between 5 and 12 MeV. The gamma radiation produced by the capture reaction can penetrate through 15-25 cms inches of steel so that a rather large percentage (1%) of this gamma radiation would routinely escape from the reactor vessel and could be detected.

In using this invention, the detectors are calibrated to detect gamma radiation primarily within a specific energy range. Moreover, a first series D of detectors 50 would be arranged to receive the gamma radiation via limited linear paths substantially tangentially from the reactor vessel wall 12 (see FIG. 2), while a second series C of the detectors 50 would be arranged to receive the gamma radiation via limited linear paths substantially tangentially from the core barrel or downcomer wall 36. A third series P of detectors 50 would be arranged to receive gamma radiation diametrically from the reactor vessel such as at the head region 32 and the upper and lower plenum regions.

Figure 2:
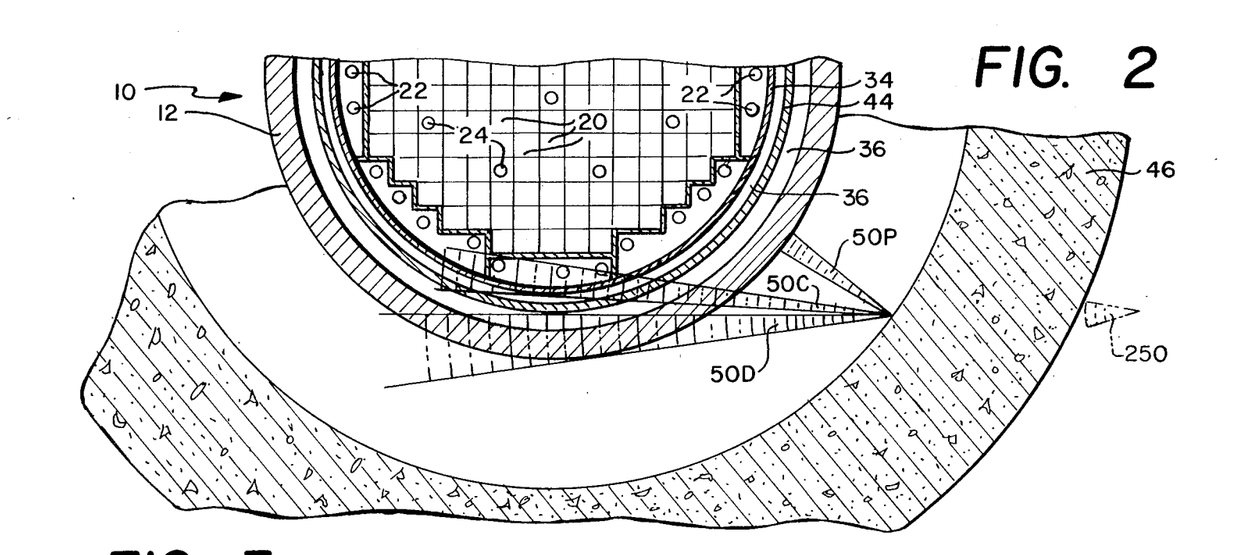
FIG. 2 is an enlarged sectional view as seen generally from line 2—2 in FIG. 1.

Of the tangential series of detectors, detectors 50-D sense the gamma radiation from the downcomer coolant flow region tangential inwardly through and from the exterior wall 12 of the reactor vessel 10 (but not from the core barrel or downcomer skirt 34), and detectors 50-C sense the gamma radiation from the core region tangential inwardly through and from the core barrel or downcomer skirt 34. These two detector series 50-D and 50-C would thereby pick up radiation ostensively only from these regions, series D detecting the downcomer flow region 36 and series C detecting the core passages 20 of the reactor vessel. The third series of detectors 50-P are arranged to receive gamma radiation from the uppermost part of the head wall 14 or other portions of the reactor vessel to detect the coolant in the plenum regions 32, 30 and 40.

Figure 5:
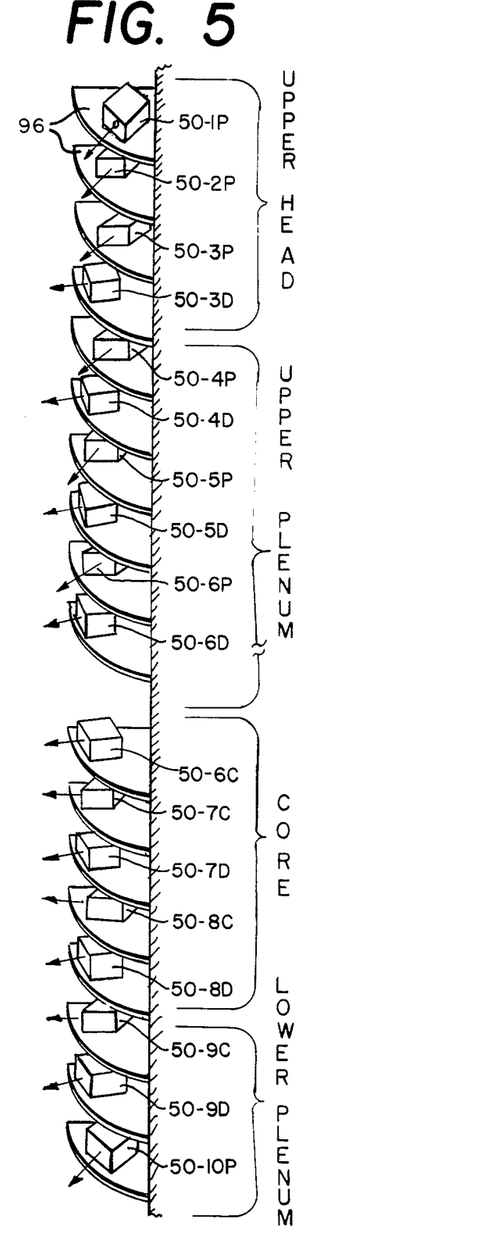
FIG. 5 is a perspective view, somewhat in schematic form showing the vertical array of detectors as would be located next to the reactor vessel and the manner of arranging them in order to detect specific regions within the vessel tangentially and radially of the vessel as previously illustrated.

The detectors 50 would be separated vertically along the side of the reactor vessel 10 to span all of the regions of the reactor vessel including the upper head 32, the upper plenum 30, the core 18 and downcomer 36, and lower plenum 40. This is illustrated in FIGS. 1 and 5 where the vertically adjacent sets of the detectors 50 are sequentially numbered from the top and are further identified as of the D, C or P series. Thus, there are detectors 50-1P, 50-2P, 50-3P and 50-3D, 50-4P and 50-4D, 50-5P and 50-5D, 50-6P, 50-6C and 50-6D, 50-7C and 50-7D, 50-8C and 50-8D, 50-9C and 50-9D, and 50-10P. The detection regions of these vertically adjacent detectors overlap slightly to provide for continuous transition information should the water level change from one detector to another. Moreover, the detection regions of laterally adjacent detectors, that is, detectors of the same set (set 3, or set 5 or set 9, for example) are isolated laterally from one another although they would vertically be very close together or coextensive.

Figure 10:
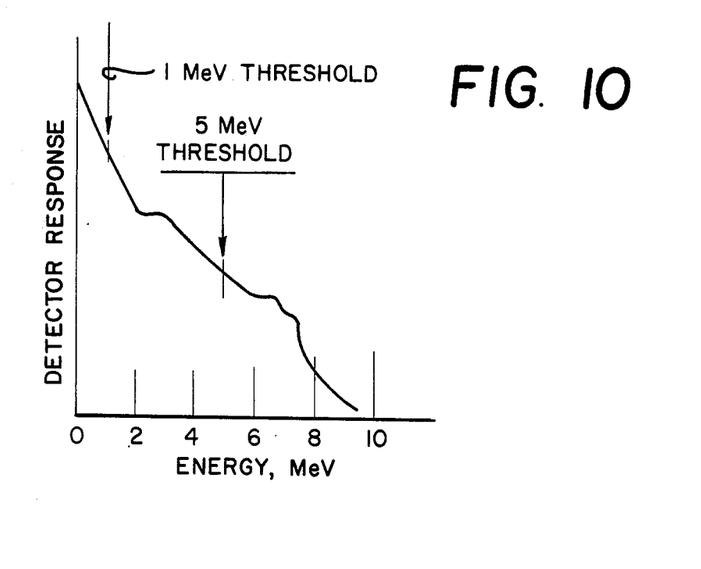

Each of the detectors would have sensitivity to gamma radiation in the 1-15 MeV energy range. The downcomer and core sensing detectors D and C, respectively, are operated with a threshold more sensitive to high-level gamma radiation (5-12 MeV) which would normally be considered as emanating then from the neutron capture by steel. See FIG. 10 as a representation of a typical signal detected by any of the detectors, where the particular intensities of energy at the desired threshold can be noted. The plenum region detectors P and particularly the head sensor 50-1P as operated would be more sensitive to gamma radiation of 2.2 MeV, indicative of water capture of the neutrons. The absence of the water in this region would allow the radiation level to decrease in the 1–5 MeV as a result of reduced incident of water capture and to increase in the 5–12 MeV range as the result of the increased incident of the neutrons striking the uncovered steel wall.

The detectors of the P series might be similar in all respects to the detectors of the D series, except that the field of radiation detection is different. In this regard, the P series detectors sense radiation generation in a plenum type region and need not be as directionally sensitive or tangentially limited through the vessel wall, and can even be radially aligned. The presence of the core at the sets 6, 7, 8 and 9, however, with its incident radiation, requires a greater directional sensitivity or limited field of scanning for the D series of detectors where radial orientation of the detector field is avoided.

Figure 9:
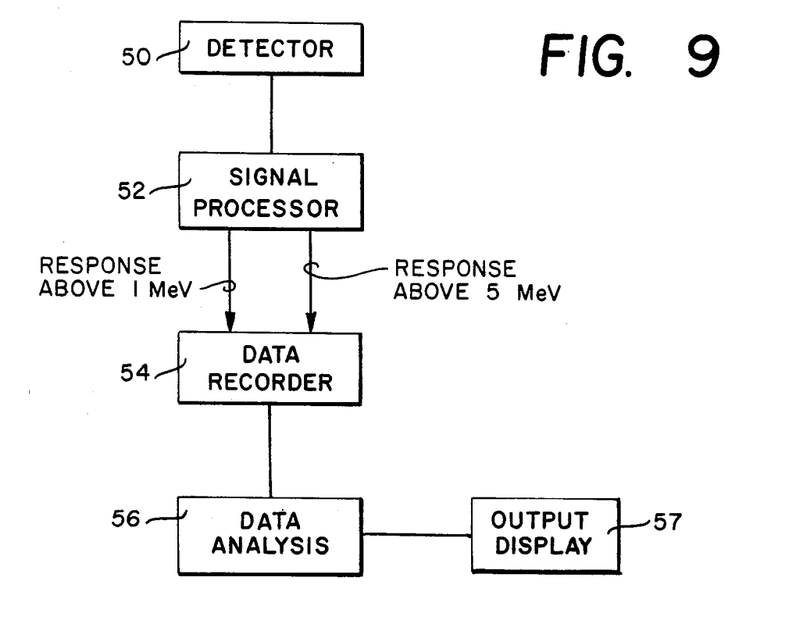
FIG. 9 is a block diagram showing a typical data pathway for monitoring, processing, recording and analyzing the signals obtained with this invention.

FIG. 9 indicates in block format the exterior components for handling the output signals from the detectors 50, including a signal processor 52, a digital data recorder 54, a data analyzer 56, and a graphical output display 58. The collimated detector signals over time can be counted and analyzed by computer techniques. The adjacent detectors of the same set would have related outputs for similar water conditions, and the ongoing signals of each detector would be compared against its past signals and against the concurrent signals of the normalizing detectors so as to detect transitions when the water level may change during operation. The changing detected signals from adjacent like detectors (the Ps, or the Cs or the Ds) would indicate the presence of the water level at some precise proximate location. If water were the cause of the neutron capture, the gamma transmission and detection would be low. However, should the water be voided at a particular location within the reactor vessel, the vessel, downcomer, or core wall itself would capture neutrons to produce higher gamma radiation of the 5–12 MeV range. The areas of greater sensitivity with time would typically be locally near and above the liquid surface.

Figure 11A:
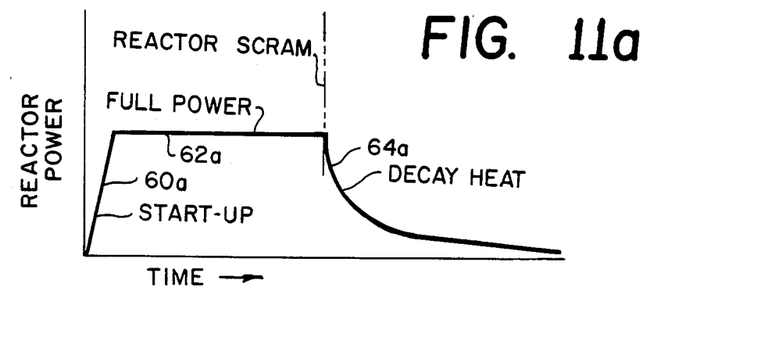
FIGS. 11a, b, and c illustrate typical responses of different detectors for varying normal and abnormal operational reactor conditions where the water level would change, and giving also correlating changes in the detector output signals.

A typical detector signal under normal operating conditions with complete liquid coolant is illustrated in FIG. 11a. This indicates a ramp-up signal 60a upon the initiation of reactor output, a reasonably level full-power signal 62a, and a radiation decay signal 64a after the reactor has been scrammed. The capture-gamma count rates would preferably be normalized against a single set of detectors (typically the detectors in the lower sets that have a greater likelihood of being under normal liquid-coolant operating conditions) so as to reduce the dependency of the results with respect to the output power levels of the reactor and to provide adequate response under the varying operational conditions of the reactor for anticipated liquid-level sensitivity. This is illustrated in FIGS. 11b and 11c for different sets of detectors and for different reactor operating conditions.

Figure 11B:
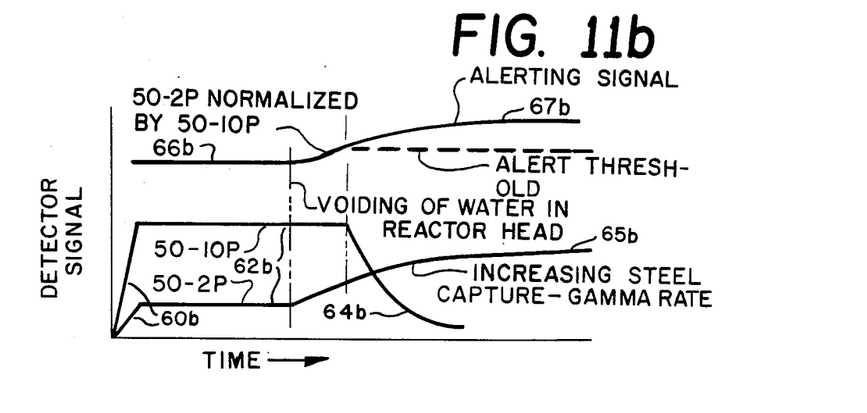

The signals of adjacent similar detectors 50-2P and 50-10P are illustrated in FIG. 11b, as is the output of detector 50-2P normalized by detector 50-10P. In this figure, the voiding of water in the head is simulated. The lower detector 50-10P is similar to the reactor power curve, having the ramp up signal 60b, the normal full power signal 62b and the post scram decay heat signal 64b. However, the higher level detector 50-2P has similar signals 60b and 62b only to the condition where voiding of water occurs in the lead, and thereupon its signal increases as at 65b. The normalized signal 66b from the head detector is noted, particularly how it increases as at 67b and can cross an alert threshold.

Figure 11C:
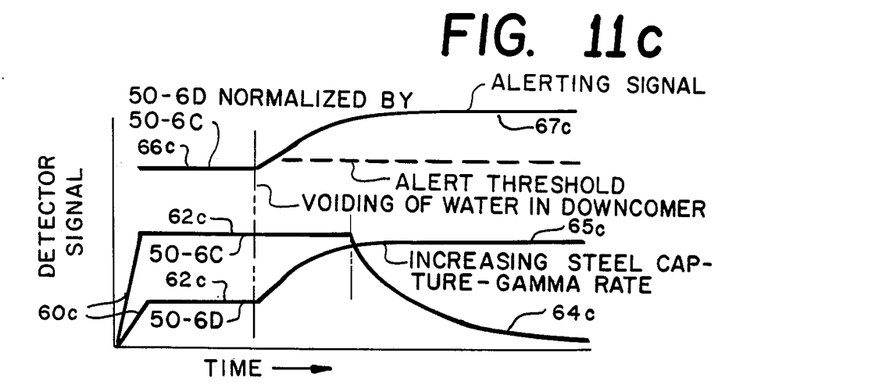

In FIG. 11c, the signals received from the core detector 50-6C and the downcomer detector 50-6D are illustrated for a simulated voiding of water in the downcomer, as is the signal of detector 50-6D normalized by detector 50-6C. Again, the ramp up 60c and full power signals 62c are noted, and is the normalized signal 66c up to the voiding of water condition. Thereupon signal 65c of detector 50-6D increases, as does the normalized signal 67c, and an alerting signal is generated that can exceed an alert threshold.

The dual array of detectors to examine the capture of gamma radiation from steel as contrasted from the proximate regions of water adjacent the steel provide great sensitivity and likelihood of comparative accuracy. The components of the system are well developed, including the detectors themselves, the signal processing electronics, and the recording and data processing systems needed to obtain end results of meaningful comparative physical correlation to the level of water in the reactor vessel.

Figure 6:
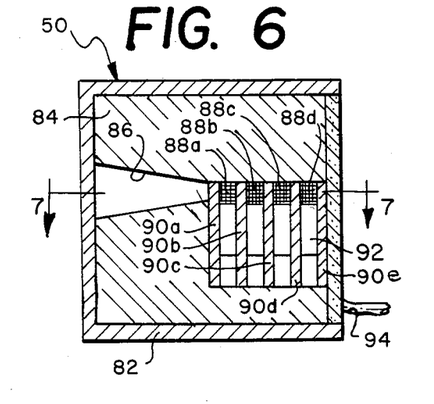
FIG. 6 is an enlarged elevational sectional view of a typical detector showing the collimator viewing slot formed therein as well as the serially arranged scintillators and filters.
Figure 7:
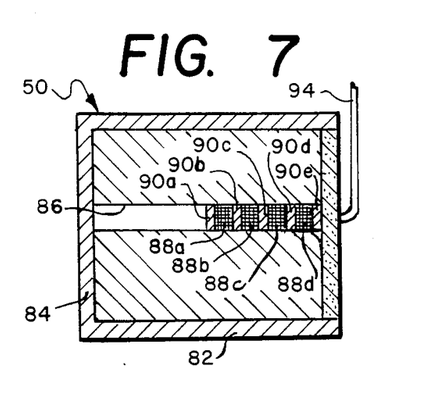
FIG. 7 is a plan-type sectional view as seen generally from line 7—7 in FIG. 6.

Each detector 50 would be housed in a radiation barrier, such as a borated concrete overwrap 82 and a lead body 84. A slotted collimating opening 86 is formed in the lead body 84 to give directional exposure only along a limited straight path from a radiation source itself. This would thereby allow for the accurate positioning of the detectors individually relative to the profile of the vessel to detect then only the specific tangential region of the vessel sought, as well as to provide limited scanning over the vertical field, to the exclusion basically of the other vertically and radially adjacent regions.

Each detector 50 will be formed of an element 88 to be stimulated by the gamma radiation and a photomultiplier tube 92 to receive the output from the scintillator element. Preferably, several such elements 88a, 88b, 88c and 88d are placed in each detector assembly. Also, a lead filter 90a is placed ahead of the lead detector 88a in the collimator range and other lead filters 90b, 90c and 90d are placed in front of each subsequent scintillation element 88b, 88c and 88d, respectively. The first scintillator 88a has its incident radiation reduced by the preceding lead filter 90a, whereas the second scintillator 88b has its activating signal reduced even more by the second lead filter 90b of comparable thickness. As a result, the range of sensitivity of the overall composite of scintillators of the detector would be enlarged. Moreover, the very last scintillator 88d would suffer the least from possible radiation-induced deterioration to minimize the need for replacement; and the multiplicity of detectors becomes increasingly redundant.

The detection element 88 can be a small sodium-iodide (thallium-activated) scintillation crystal, for example, or a Cherenkov radiation crystal or other gamma detector with energy discrimination capability. A photomultiplier tube or photodiode 92 associated with each scintillator generates an electric signal that is proportional to the intensity of gamma radiation imposed on the scintillator. The signal from the photomultiplier or photodiode would be transmitted via conductor 94 from the detector 50 to the electronic analysis components and circuitry (see FIG. 9) located outside of the biological shield. Also, with respect to preferred thermal environment, the ambient temperature limit for scintillator detector and photomultiplier assemblies is usually 150° C. Furthermore, the nonintrusive detectors 50 are not subject to damage because of changes in the coolant level being monitored.

Figure 3:
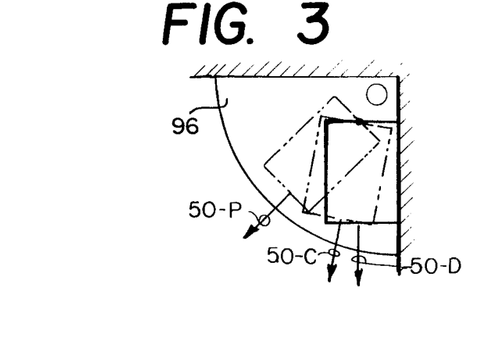
FIG. 3 is an enlarged plan view of the detectors as illustrated in FIG. 2.
Figure 4:
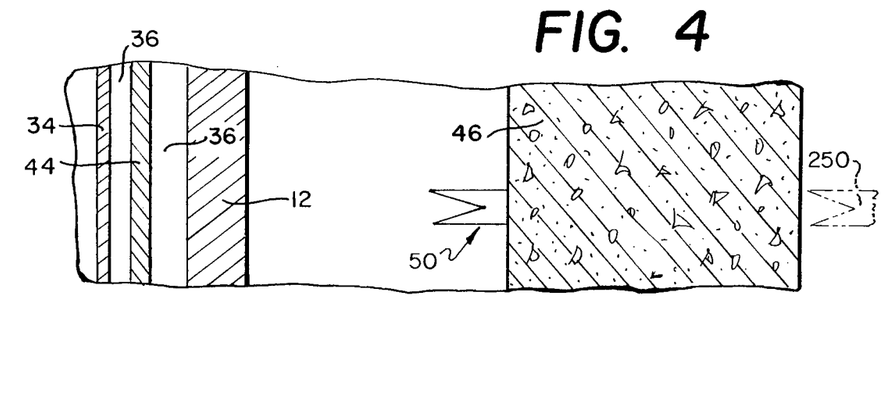
FIG. 4 is an enlarged elevational sectional view of the reactor walls as might be detected by the arrangement illustrated in FIG. 2.

As shown in FIGS. 3 and 5, the detectors 50 can be carried in an array as via a pivot connection relative to spaced support platforms 96. Servo mechanical (not shown) can be mounted between each detector 50 and its platform 96 to allow rotational adjustment of the beam detecting orientation as along the lines 50-D, 50C and 50-P listed in FIG. 3, or other beam angle.

The invention would be well suited in new large commercial water reactors for monitoring the cooling water levels in the reactor vessel; but it could be retrofitted into an existing reactor with the detectors being in the region adjacent the reactor vessel, either inside the biological shield if space permits or outside the biological shield. The system should have sufficient sensitivity to provide readouts at full reactor power as well as in for continuing observation at decay-heat levels in the event of reactor shut down. Moreover, the monitoring system is entirely external of the pressure boundaries of the reactor vessel and thus should have great durability and be immune from destruction caused by water level changes and/or core overheating.

Of interest also is the use of this invention to detect fuel cladding failures. For example, failure of the cladding on the fuel pins releases the isotope $Kr^{87}$ which would rise through the coolant to accumulate at the head of the reactor vessel. The gamma radiation from the $Kr^{87}$ is of the order of 2.8 MeV. Accordingly, the detector 50-1P (or a separate detector 150) in the upper head region would be sensitive to the buildup of this radiation level and could be programmed when this threshold was reached to indicate fuel-pin failure; and further forewarn of possible reactor operational-safety implications. The sensitivity of the system with proper adjustments could probably detect the failure of a single fuel pin. The downwardly-looking gamma detector 150 located at the top of the reactor vessel should see a net increase over the entire 1–12 MeV range as water level decreases.

Experience in the use of detectors of this type suggest that liquid-level resolution accuracy of the order of perhaps 10–20% of the spacing between adjacent like detectors would be routinely possible. By appropriate use therefore of a detector, every meter for example, the vertical resolution would be accurate to within perhaps 10–20 centimeters. Moreover, each detector being of the multiple scintillator type provides a wide dynamic range, redundancy, and increased radiation endurance for dependability over continued reactor operation. It would be possible to combine (by conventional switching arrangements, not shown) the output signals from these multiple scintillator elements in order to increase the count rate under a low power or scrammed decay rate fission condition. The generated signals could be either pulse counted or current integrated to provide a wide dynamic range of signal input. Because the fuel, the fuel cladding, and water proximate the fuel elements have significantly lower capture-gamma energy when compared to steel, their radiation would provide background that could be biased out by setting a relatively high bias (5 MeV or more) to be sensitive then to the capture-gamma signal of the steel vessel walls directly. Control-rod materials might produce some relatively high-energy gamma radiation, but again this can be compensated for by proper design.

Even though the region of sighting of a detector would spread out slightly to include signal input from adjacent regions both inwardly and outwardly radially of the sought-for region, the impact of the same could be beneficially used by comparing the signals from other detectors by ratioing or by differential means. Thus, the downcomer zone detectors 50-D would be influenced by the core-level activity (and vice-versa to some extent); however, repeated monitoring and comparing, against its past signals and against the vertically adjacent downcomer-region detectors and laterally adjacent core-region detectors provide a reference that can be factored out. Because the core-related capture rate would be significantly greater than the downcomer-related source term, it would be easier to eliminate the effects of the latter.

The detectors further would be sensitive to the density of the coolant caused by bubbles and/or other voids that might exist to provide a water-steam mixture. Appropriate interpretation could result from calibrated comparative outputs, particularly when normalized against a detector near the bottom of the vessel.

While the embodiment illustrated shows the detector array in immediately adjacent proximity to the reactor vessel 10 and inwardly disposed from the biological shield 46, the detectors 50 could be moved further outwardly and perhaps even into or to the remote side of the biological shield 46. This is illustrated in phantom at 250 in FIG. 2. It is generally assumed that the gamma transmission through even half a meter of ordinary concrete would still be of the order of 4–6% of its incident signal strength to the extent that adequate signal counts could yet be obtained. The detectors 250 placed remotely of the biological shield 46 from the reactor core 18 would receive reduced radiation which beneficially might extend the life of the detectors and offer greater detector accessibility for maintenance and repair.

Any neutron detection method of appraising water level depends upon leakage of a relatively small fraction (<1%) of neutrons from the reactor vessel. On the other hand, the 99% of the neutron generation caught in the pressure vessel will lead to a capture gamma radiation for each. This gamma radiation will have about a 1% chance of transmission through the full thickness of steel. Gamma detectors are usually more efficient than neutron detectors, so that the resulting capture gamma count rate is likely to be stronger than the neutron rate. Detection of fast neutrons would further reduce the count rate, although it might improve the neutron signal/background ratio. It is likely that the gamma radiation mode will nonetheless have the edge on fast-neutron detection as far as comparative signal/background ratios.

The sensitivity of water-level changes depends on the inherent signal strength and such quality factors as the signal/background ratio. It is also highly dependent on relative effects of the downcomer and core fluids.

In terms of signal strength, two types of background will generally be present: (1) that which enters the detector through the shielding, and (2) that which is part of the collimated beam content. Because of collimation, the external background is likely to be small, especially with high bias levels. The detector is designed to concentrate on the gammas derived from steel interfaces, in particular the core barrel and the thermal shield (to represent the core liquid level) and the pressure vessel (to represent the downcomer level). In addition, fission-fuel and water-originated gamma radiation exist, but these gamma radiation signals would be biased out, except for their use in the head region and during cold startup. However, if the tangential viewing leads to a favorable signal/background ratio, the bias may be set lower than 5 MeV; in particular, the downcomer set of detectors might have a higher signal rate at an acceptable signal/background ratio if the threshold is set at about 1.5 MeV.

The effective source strength will be a function of not only the respective fluid levels of the core and downcomer, but also the relative densities of the two coolant flow paths. The degree of homogeneity of the core coolant (single or two-phase flow) will uniformly or differentially affect the array of detectors aimed at core liquid. The full axial coverage provides data for sensitivity to axial variations in coolant density. In any case, the liquid-solid and liquid-gas interfaces would provide major signal-slope changes.

The net efficiency of the gamma method becomes quite important in considering detection of water level in the vessel head. The number of neutrons that migrate to that region will probably be inadequate for the neutron method: whereas essentially all of the neutrons that enter the pressure vessel including the head provides a signature for the gamma system. Moreover, with the absence of competing core fission and steel capture gamma in that zone, the gamma detector discrimination level may be lowered to detect the 2.2 MeV capture gamma from water, which will simultaneously improve detector efficiency for steel-capture gamma radiation.

The uncollimated neutron method depends on geometrical integration to achieve adequate sensitivity, thereby losing specific axial and radial resolution. The disclosed collimation of the gamma signals offers better spatial resolution, and also offers the possibility of distinguishing between core and downcomer or plenum regions, a separation that is not available with the uncollimated neutron method.

With tangential viewing, a one-dimensional array of steel-capture gamma-radiation detectors, located external to the pressure vessel, should be able to monitor the water levels and density in various regions in the reactor vessel including the downcomer, core, and reactor head, and from zero to fuel power.

In summary, the subject invention detects the capture-gamma radiation in the steel vessel walls surrounding the core and/or in the liquid itself in the cooling system. The comparative evaluation of the signals of many adjacent and appropriately located gamma-radiation detectors thereby gives the liquid level and density, should either change relative to the various detectors. The system should provide sharp resolution of the liquid level and further to distinguish the liquid level at varying locations within the reactor including in the head, upper and lower plenum, the downcomer and core regions. The monitoring of water level, water density, and fuel failure comprise a nondestructible operational-safety procedure that can be used to avert off-normal conditions for a water-cooled fission reactor.

The embodiment of the invention in which an exclusive property or privilege is claimed are defined as follows:

1. For use with a fission reactor having a pressure vessel, a core in the pressure vessel, means for generating fission reaction heat in the core, and means including a coolant circulating under pressure through the reactor vessel and core for transmitting said heat to outside of the reactor for external conversion to useful work, improved monitoring means for determining the level of the coolant at various regions in the reactor vessel, comprising the combination of a plurality of gamma radiation detectors; means for positioning the radiation detectors adjacent the reactor vessel on the exterior side thereof, said radiation detectors being vertically spaced apart over the reactor vessel and said detectors being arranged in at least two sets, wherein each set of detectors is orientated radially to span different radially adjacent regions in the reactor to the exclusion primarily of the other sets; means for collimating each of the detectors to admit gamma radiation energy only along a limited substantially straight beam path, and means for detecting changes in the signals of the respective detectors and for apprising the corresponding changes in the level and density of the water proximate thereto.

2. The monitoring combination according to claim 1, further including radiation barrier means surrounding each detector, and wherein the collimating means includes a slotted opening within the barrier directed toward the detector.

3. The monitoring combination according to claim 2, further including a lead filter disposed crosswise to the opening and otherwise blocking the signal so that the strength of said signal is effectively reduced by the effectiveness of the filter.

4. The monitoring combination according to claim 3, further providing that each detector is in the form of a scintillator against which the radiation beam is directed.

5. The monitoring combination according to claim 4, further including a plurality of such scintillators in each detector and arranging the scintillators in series with each other in the direction of the collimating opening and radiation beam, and a plurality of lead filters disposed crosswise to the opening and each located between each scintillator and otherwise blocking the beam so that the strength of the signal detected by each scintillator is progressively reduced by the effectiveness of the filters.

6. The monitoring combination according to claim 1, further providing that the detectors of a set identified as D are arranged to sense radiation primarily along a limited straight path from the reactor vessel outside wall and the space inwardly adjacent thereto for downcomer coolant flow.

7. The monitoring combination according to claim 1, further providing that the detectors of a set identified as C are arranged to sense radiation primarily along a limited straight path from the core wall and its passages therein for the core coolant flow.

8. The monitoring combination according to claim 1, further providing that the detectors of a set identified as P are arranged to sense radiation primarily along a limited straight path from the interior plenum regions of the reactor vessel including specifically the uppermost head region thereof normally filled with the liquid coolant.

9. The monitoring combination according to claim 1, further providing that the detectors of a set identified as D are arranged to sense radiation primarily along a limited straight path from the reactor vessel outside wall and the space inwardly adjacent thereto for downcomer coolant water flow, and further providing that the detectors of a set identified as C are arranged to sense radiation primarily along a limited straight path from the core wall and its passages therein for the core coolant flow.

10. A monitoring combination according to claim 9, further providing that the detector of a set identified as P are arranged to sense radiation primarily along a limited straight path from the interior plenum regions of reactor vessel including specifically the uppermost head region thereof.

11. The monitoring combination according to claim 10, further including radiation barrier means surrounding each detector, and wherein the collimating means includes a slotted opening within the barrier directed toward the detector.

12. The monitoring combination according to claim 11, further including a lead filter disposed crosswise to the opening and otherwise blocking the signal so that the strength of said signal is effectively reduced by the effectiveness of the filter.

13. The monitoring combination according to claim 12, further providing that each detector is in the form of a plurality of scintillators arranged in series with each other in the direction of the collimating opening and radiation beam, and a plurality of lead filters disposed crosswise to the opening and each located between each scintillator and otherwise blocking the beam so that the strength of the signal detected by each scintillator is progressively reduced by the effectiveness of the filters.

14. The monitoring combination according to claim 13, further providing each scintillator is of the form of a thallium-activated sodium-iodide crystal, and a photomultiplier is coupled to the output thereof.

15. The monitoring combination according to claim 13, further providing each scintillator is of the form of a Cherenkov radiation device, and a photomultiplier is coupled to the output thereof.

16. The monitoring combination according to claim 13, further providing that each of said detectors is sensitive to gamma radiation in the range between approximately 1 and 15 MeV.

* * * * *